(12) United States Patent
Torry et al.

(10) Patent No.: US 9,340,642 B2
(45) Date of Patent: May 17, 2016

(54) CURING METHOD FOR POLYETHER

(75) Inventors: Simon A Torry, Sevenoaks (GB);
Anthony V Cunliffe, Salisbury (GB);
David A Tod, Sevenoaks (GB)

(73) Assignee: QINETIQ LIMITED, London (GB)

( * ) Notice: Subject to any disclaimer, the term of this patent is extended or adjusted under 35 U.S.C. 154(b) by 175 days.

(21) Appl. No.: 12/991,266

(22) PCT Filed: May 18, 2009

(86) PCT No.: PCT/GB2009/001238
§ 371 (c)(1),
(2), (4) Date: Nov. 5, 2010

(87) PCT Pub. No.: WO2009/141593
PCT Pub. Date: Nov. 26, 2009

(65) Prior Publication Data
US 2011/0060119 A1  Mar. 10, 2011

(30) Foreign Application Priority Data
May 23, 2008  (GB) .................................. 0809439.3

(51) Int. Cl.
C08L 63/00 (2006.01)
C08G 59/14 (2006.01)
C08G 59/68 (2006.01)
C08G 59/24 (2006.01)
C08L 71/02 (2006.01)

(52) U.S. Cl.
CPC .............. *C08G 59/688* (2013.01); *C08G 59/24* (2013.01); *C08L 71/02* (2013.01); *C08L 63/00* (2013.01)

(58) Field of Classification Search
CPC ....................................... C08G 59/24
USPC ....................................... 525/523
See application file for complete search history.

(56) References Cited

U.S. PATENT DOCUMENTS

| 4,543,430 A | 9/1985 | Falgoux et al. |
| 4,599,401 A * | 7/1986 | Koleske .......................... 528/408 |
| 5,304,662 A * | 4/1994 | Thoseby et al. ............... 549/556 |
| 5,362,835 A * | 11/1994 | Rolfe et al. ...................... 528/87 |
| 5,955,551 A * | 9/1999 | Cheng et al. ................... 525/507 |
| 6,617,418 B1 | 9/2003 | Magnusson |
| 2005/0133128 A1 * | 6/2005 | Sanderson et al. .............. 149/46 |

FOREIGN PATENT DOCUMENTS

| EP | 0 493 916 | 7/1992 |
| GB | 2 296 248 | 6/1996 |
| WO | WO 00/08087 | 2/2000 |

OTHER PUBLICATIONS

International Search Report for PCT/GB2009/001238, mailed Sep. 17, 2009.
Written Opinion of the International Searching Authority for PCT/GB2009/001238, mailed Sep. 17, 2009.
UK Search Report for GB 0809439.3, dated Sep. 23, 2008.

* cited by examiner

*Primary Examiner* — David Karst
(74) *Attorney, Agent, or Firm* — Nixon & Vanderhye P.C.

(57) ABSTRACT

This invention relates to a novel curing method of oligomers, using metal triflates, and particularly to the curing of hydroxyl terminated elastomers to achieve crosslinked polymers. The method finds particular use as an alternative cure methodology to replace isocyanate curing. There is further provided a cured and crosslinked polymer binder, which is particularly suitable and compatible for use with energetic materials.

Reaction scheme 1

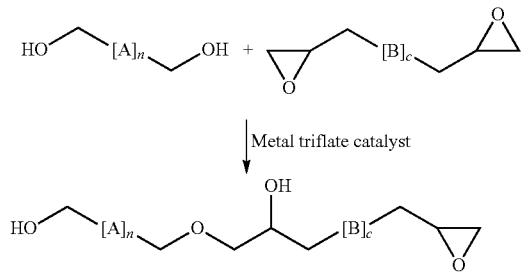

3 Claims, No Drawings

CURING METHOD FOR POLYETHER

This is the U.S. national phase of International Application No. PCT/GB2009/001238 filed 18 May 2009 which designated the U.S. and claims priority to GB Application No. 0809439.3 filed 23 May 2008; the entire contents of each of which are hereby incorporated by reference.

This invention relates to the field of curing oligomers, particularly the curing of hydroxyl terminated elastomers to achieve crosslinked polymers. The method finds particular use as an alternative cure methodology to replace isocyanate curing. There is further provided a cured and crosslinked polymer binder, which is particularly suitable and compatible for use with energetic materials.

Isocyanates, or di-isocyanates, are basic constituents in the production of polyurethane. Methods of use vary but the essential process is that they combine with hydroxyl terminated polymeric resins causing a reaction which creates durable polyurethane foams, elastomers, paints or adhesives. Whilst isocyanates are extremely useful, they are known to be irritants and highly potent sensitising agents which affect the skin and the upper respiratory tract.

Elastomers are commonly cured with approximately 1 to 10% isocyanates to for n polyurethanes. There are numerous uses for the resulting rubbers such as o-rings, rollers, belts, damping elements, sleeves, valve seats etc. Such materials are widely used in a huge number of industries such as agriculture, transport, aerospace, building, furniture industries etc. Numerous types of hydroxy terminated elastomers are cured with isocyanates—these include various types of polyethers, polyesters, polyalkanes and polyalkenes. As well as the above uses, elastomers are used extensively as binders for composite rocket motors.

The advantage of using isocyanates as a curing agent is their ability to readily react with many functional groups under mild conditions. However, isocyanates have many drawbacks such as toxicity and their hazardous production, the Bhopal disaster being the most significant example. Their excellent reactivity makes them very useful; however their use is becoming more limited due to tighter safety regulations. However, lack of alternative processes and the industrial importance of the resulting polyurethanes have so far outweighed the risks of isocyanate manufacture and processing.

According to a first aspect of the invention there is provided a method of forming a crosslinked polyether polymer comprising the steps of forming an admixture of at least one hydroxy terminated oligomer, at least one epoxy terminated oligomer and at least one metal trifluoromethanesulfonate salt catalyst, and curing the resultant admixture at an elevated temperature.

It is desirable that at least one of the hydroxy or epoxy oligomers present is comprised of at least 5 to 10% w/w of an oligomer which has in the range of 3 to 5 hydroxy or epoxy groups respectively, to promote cross linking.

In a further embodiment the admixture comprises a further epoxy terminated oligomer, which contains an average of 2.5 to 4 epoxy groups per oligomer chain, and is present in the range of from 5-10% w/w of the admixture.

The hydroxy and/or epoxy terminated oligomers may comprise a non-integer number of hydroxy groups or epoxy groups per oligomer chain, due to the methods of synthesising oligomers. Clearly, any side reactions which occur during the synthesis of these oligomers may result in the formation of branched chains. These branched chains may also possess a hydroxy or epoxy unit at the end of said branch, thereby causing the oligomer (as a mixture) to possess a non-integer number of hydroxy or epoxy groups.

Crosslinked polymers that are particularly suitable for binders for energetic materials desirably comprise polyhydroxy terminated oligomers, wherein the oligomer is of formula (i)

formula (i)

wherein A is an oligomer containing monomer repeat units, m is the average number of monomer repeat units in the range of from 1 to 10000, and x is in the range of from 2 to 20; and the polyepoxy terminated oligomer is of formula (ii)

formula (ii)

wherein B is an oligomer containing monomer repeat units, n is the average number of monomer repeat units in the range of from 1 to 10000, and y is in the range of from 2 to 20.

The crosslinked polymer may comprise two or more independently selected formula (i) components and/or two or more independently selected formula (ii) components. The at least one hydroxy terminated oligomer is preferably selected from oligomer units which are terminated with at least two hydroxyl groups, preferably the number of hydroxyl groups present per oligomer, i.e. x is preferably in the range of from 2 to 10, more preferably in the range of from 2 to 4.

In an alternative arrangement the hydroxy terminated oligomer is of formula (i),

formula (i)

wherein A and m are as hereinbefore defined and x is in the range of from 1 to 3; and the epoxy terminated oligomer is of formula (ii)

formula (ii)

wherein B and n are as hereinbefore defined and y is in the range of from 1 to 3, and the admixture comprises a further epoxy terminated oligomer of formula (iii), present in the range of from 5-10% w/w,

formula (iii)

wherein D is an oligomer containing monomer repeat units, p is the average number of monomer repeat units in the range of from 1 to 10000 and z is in the range of from 2.5 to 3.

The molar ratio of functional end groups in formula (i): formula (ii) may be varied preferably the ratio is of from 0.65:1, more preferably 0.85:1, yet more preferably the hydroxyl and epoxy groups are present in the ratio of 1:1 i.e. substantially equimolar ratio. When the ratio is equimolar, preferably 5-10% w/w of at least one of the hydroxy terminated oligomer or the epoxy terminated oligomer contains an average of 2.5 to 3 hydroxyl groups per oligomer chain. Alternatively it may be desirable to provide the equimolar admixture with 5-10% w/w of the further epoxy terminated oligomer. The use of 5-10% w/w of oligomer with greater than 2 functional groups (i.e. epoxy or hydroxyl) will help to promote crosslinking in the final crosslinked polymer.

Preferably the hydroxy terminated oligomer has substantially two terminal hydroxy groups and the epoxy terminated oligomer has substantially two terminal epoxy groups, such that the ratio of hydroxyl to epoxy is substantially 1:1, preferably the admixture comprises at least one further epoxy terminated oligomer, which contains an average of 2.5 to 3 epoxy groups per oligomer chain, and is present in the range of from 5 to 10% w/w.

Preferably, the polyhydroxy terminated oligomer is a di-hydroxy terminated oligomer of formula (ia)

formula (ia)

wherein A and n are as hereinbefore defined, the polyepoxy terminated oligomer is di-epoxy oligomer of formula (iia)

formula (iia)

wherein B and m are as hereinbefore defined and optionally the admixture comprises a further epoxy terminated oligomer of formula (iii), present in the range of from 5-10% w/w,

formula (iii)

wherein D, p and z are as hereinbefore defined.

The oligomer may comprise a series of repeating monomeric units of A, B or D, such as, for example hydrocarbyl, esters, carbonates, ethers, amides, aromatics, heterocyclic or copolymers comprising mixtures thereof. The hydrocarbyl may be optionally interposed with heteroatoms, esters, carbonates, ethers, amides, aromatics or heterocyclic groups, the hydrocarbyl may also optionally substituted with functional groups, such as for example halo, nitro, haloalkyl, short chain $C_1$-$C_6$ alkyl. The hydrocarbyl may be a combination of straight or branched chain alkyl, alkenyl or alkynyl groups. Preferably the oligomer of formula (i) is an elastomer, i.e. one which possesses similar elastic properties to that of natural rubber.

The monomeric units A, B or D (when present) may all be the same, preferably the oligomer backbone of the hydroxy oligomer A is selected from a different oligomer to the epoxy oligomer B or D. The oligomers of A, B and D may themselves be in the form of homo-oligomers, i.e. all monomeric units within an oligomer may be the same or co-oligomers such that the monomeric units within the oligomer are selected from different monomeric units. The co-oligomers may be arranged such as, for example, as block, random, or statistical co-oligomers.

The number of repeat units of m, n and p are in the range of from 1 to 10,000, more preferably m, n and p are in the range of from 5 to 100 units, so as to provide oligomers with an average molecular weight less than 10,000. More preferably m, n and p are in the range of from 20 to 50 units to provide oligomers with average molecular weights of less than 5000.

Preferably the epoxy terminated oligomer and the further epoxy terminated oligomer, when present, possess fewer units than the hydroxy terminated oligomer. Preferably the epoxy terminated oligomers, have less than 100 units, preferably less than 50 units, more preferably 1 to 10 units. Preferably the hydroxyl terminated oligomers have less than 100 units, more preferably 1 to 50 units.

It will be clear that oligomers, due to their method of synthesis, are typically represented as having an average number of units, such as for example a 20 unit oligomer may actually have a spread of oligomers from 10 to 30 units.

A particularly preferred system is the use of hydroxy terminated polybutadiene (HTPB) with an average molecular weight range of 1200 to 2500 (indicative of a spread of different length monomer units, typically between 22 to 50 units), in combination with an epoxy terminated oligomer with 1 to 5 units.

Examples of hydroxy terminated oligomers are $$HO-(CH_2CH=CHCH_2)_n-OH$$

Hydroxy terminated polybutadiene (HTPB)

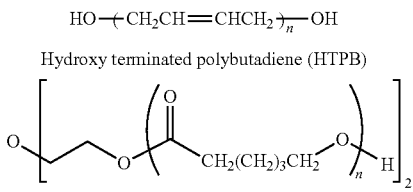

Polycaprolactone

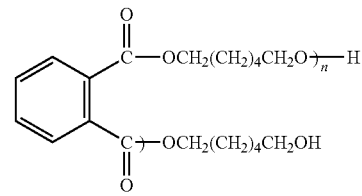

Poly(hexamethylene phthalate), diol terminated

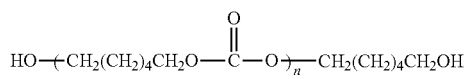

Poly(hexamethylene carbonate) diol

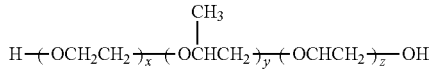

Poly(ethylene glycol)-block-poly(propylene glycol)-block-poly(ethylene glycol)

HTPB is particularly useful oligomer of formula (i), which comprises a plurality of repeating butadiene monomer groups. HTPB is currently used in crosslinked polymers designed to be used for energetic material binders, as it possesses a low glass transition temperature, low moisture capacity, good processing properties and good mechanical properties for cured elastomers.

Examples of epoxy oligomers are:

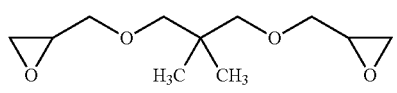
Neopentyl glycol diglycidyl ether

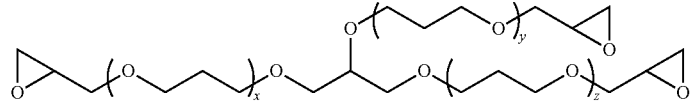
Glycerol propoxylate triglycidyl ether

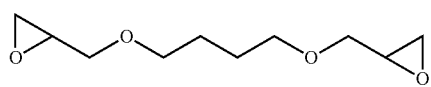
1,4-Butanediol diglycidyl ether

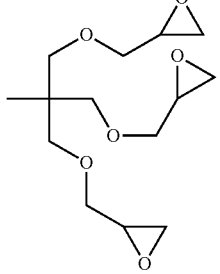
trimethylolethane triglycidyl ether

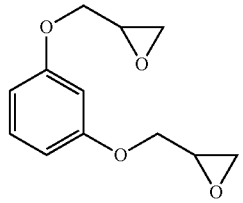
Resorcinol diglycidyl ether

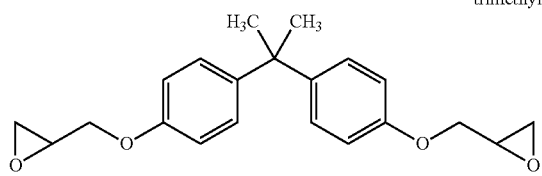
Bisphenol A diglycidyl ether

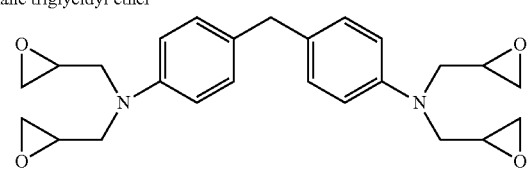
4,4'-Methylenebis(N,N-diglycidylaniline)

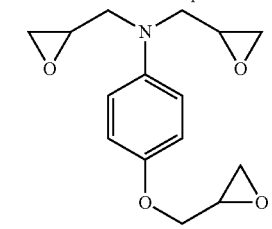
N,N-Diglycidyl-4-glycidyloxyaniline

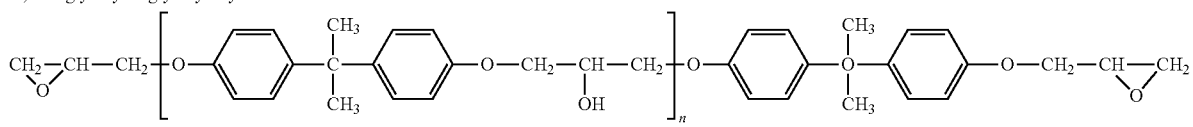
Epikote™ general structure

It would be clear that the hydroxyl groups of oligomer A could be readily replaced with epoxy functionality, and similarly the epoxy groups oligomer B and D could be replaced with hydroxyl groups.

The component repeat units which make up the oligomer A, B and D will provide the final cross linked polymer with different physical and chemical properties, such as, for example the degree of—hydrophobicity or hydrophilicity. The rigidity and glass transition temperatures of the final cured crosslinked polymer will be determined by both the appropriate selection of the oligomer backbone A, oligomer B and oligomer D, when present, and also the degree of cross linking that occurs.

Preferably the metal of the at least one metal triflate is a rare earth metal, a group III metal or gallium, which is known to possess similar chemical properties to rare earth metals. The group III metals are preferably selected from scandium or yttrium. Preferably the metal is a lanthanide or actinide, more preferably a lanthanide, yet more preferably lanthanum, cerium, praseodymium, neodymium, promethium, samarium, europium, gadolinium, terbium, dysprosium, erbium, thulium or ytterbium.

The metal is preferably scandium or yttrium, as they provide increased rates of reaction and are more cost effective.

Yet more preferably the catalyst comprises scandium (III) trifluoromethanesulfonate, yttrium (III) trifluoromethanesulfonate, samarium (III) trifluoromethanesulfonate, europium (III) trifluoromethanesulfonate, erbium (III) trifluoromethanesulfonate, ytterbium (III) trifluoromethanesulfonate or cerium (IV) trifluoromethanesulfonate. The ligand trifluoromethanesulfonate is commonly referred to an abbreviated form of triflate, TFMS or (OTf).

A rare earth metal catalyst preferably does not have any other ligands present. It may not be desirable to incorporate further ligands onto the rare earth metal, as this may cause steric hindrance, as the use of bulky coordinated ligands may affect the ability of the rare earth metal salt to successfully coordinate with the oxygen atoms on the epoxy oligomer.

In order to delay the onset of curing, it may be desirable to form a pre-admixture comprising any two of the at least one polyhydroxy terminated oligomer, at least one polyepoxy terminated oligomer and at least one metal trifluoromethanesulfonate salt catalyst, and then add the final component at a selected time to cause the curing of the admixture. This would allow ready storage of the components to form a two component mix, which could be cured by forming the admixture and causing curing to occur.

There is further provided a kit for use in the above method comprising the following components either all provided separately in the kit, or with any two provided in combination and the third provided separately:—
at least one hydroxy terminated oligomer;
at least one epoxy terminated oligomer;
at least one metal trifluoromethanesulfonate salt catalyst; and,
wherein the kit further comprises optional instructions for use. Preferably, the respective components are provided in suitable ratios to produce a useful crosslinked polyether polymer. The catalytic component may be combined with either oligomer.

Preferably the admixture of the hydroxy terminated oligomer and the epoxy terminated oligomer is formed in the substantial absence of solvent. The catalysts are solids in the form of salts, therefore in order to aid the incorporation of the catalyst into the admixture, it may be desirable to dissolve the catalyst in a minimum quantity of a volatile solvent prior to adding to the admixture. Preferably the solvent is removed prior to curing the admixture, such that curing takes place in the substantial absence or complete absence of solvent. Typically the solvent that is used to dissolve the catalyst may be a ketone, ether, alcohol or an aprotic solvent.

It is desirable to carry out the curing reaction in the substantial absence of solvent as certain oxygen containing aprotic solvents may reduce the activity of the catalyst, such as for example tetrahydrofuran or dioxane. In these cases it is possible that the catalyst may coordinate with the solvent in preference to the epoxide functionality. Further advantages to performing the curing stage in the substantial absence of solvent are reducing the cost of handling, storing and disposing of the solvent. A further benefit is reducing the likelihood of inclusion of trapped solvent in the final cured crosslinked polymer.

The metal triflates are only required in catalytic amounts, which significantly reduces the cost of processing and curing the admixture. Preferably the catalyst is present in an amount of from 0.01% to 2% by mass of the reaction mixture, more preferably the catalyst is present in the range of from 0.05 to 1%, more preferably in the range of from 0.2 to 1%. The catalyst may be left in the admixture, it may be recovered, or may be incorporated as part of a solid support, which may later be removed.

There is further provided a composition comprising a crosslinked polyether polymer, which polymer includes residual catalytic amounts of at least one metal trifluoromethanesulfonate salt catalyst.

As the reaction is preferably carried out in the substantial absence of solvent the curing reaction does not need to be subjected to reduced pressures in order to remove the solvent, and hence may be readily carried out at atmospheric pressures. Preferably the curing step is carried out at an elevated temperature, i.e. above room temperature, and preferably the curing step is carried in the temperature range of 30 to 80° C., more preferably 40 to 60° C. It may also be desirable to form the admixture at an elevated temperature in order to reduce the viscosity of the oligomers. The reaction according to the invention provides a desirable alternative to isocyanate curing of polyhydroxy terminated oligomers, without the use of toxic or corrosive reagents.

A further problem with the use of isocyanates is that they are reactive with water and so will readily decompose to release carbon dioxide if they come into contact with moisture i.e. such as, for example from insufficiently dried starting materials. Advantageously the catalytic activity of metal triflate catalysts is not affected by the presence of moisture. The formation of the admixture and even the curing step of the reaction may, if desired, be carried out in the presence of water or a protic solvent. However, the subsequent removal of said solvent, prior to or during curing, would still need to be addressed.

According to a further aspect of the invention, there is provided a cured polymer obtainable by the method according to the invention.

In a further embodiment the admixture further comprises at least one filler material. It may be desirable to incorporate fillers i.e. additives into the admixture to alter the properties of the crosslinked cured polymer. Conveniently the filler is added to the admixture and mixed to form a uniform dispersion of the filler and admixture, prior to curing. The fillers may be selected from those routinely used in polymer chemistry, such as, for example, plasticisers, stabilisers, antioxidants, inert fillers, photostabilisers, pigments, etc.

In a preferred embodiment the filler is an energetic material, i.e. an explosive, such as, for example, a high explosive or propellant material.

According to a further aspect of the invention there is provided a method of forming a polymer bonded explosive, comprising the steps of forming an admixture as defined hereinbefore, uniformly dispersing an energetic material in said admixture and curing the resultant mixture at an elevated temperature; optionally the mixture may also contain a plasticiser.

Plasticiser are commonly used to lower the glass transition temperature and improve low temperature mechanical properties. Plasticisers are particularly important for use in creating binders for use with energetic materials, as they may improve processability, decreases hazard properties, and can increase the performance of energetic composites.

The method according to the invention finds particular advantage in its use in curing oligomer units to form a crosslinked polymer which is suitable for use with energetic materials. It is a well documented that isocyanates are incompatible with certain energetic fillers, such as, for example, ammonium dinitramide. Ammonium dinitramide is a well known rocket motor propellant oxidiser, which is being increasingly incorporated into rocket motors due to its good combustion properties.

Accordingly there is provided an explosive formulation comprising at least one energetic material uniformly dispersed in at least one cured polymer prepared by a method according to the invention. The cured admixture may be present in the range of from 1 to 40 w/w of the explosive formulation.

There are other reagents which can activate the reaction of an alcohol and an epoxy to afford a polyether. Typical reagents may be aqueous strong acids or bases, tributyl tin complexes or boron trifluoride. In the case of the latter two examples, the reagents are also toxic, moisture sensitive and as such their use would not be well suited to industrial application. Moreover, the above reagents would not be particularly well suited to be used in the processing of energetic materials, due to the possibility of adverse reactions.

As a yet further advantage, lanthanide triflates, at the concentrations used in the curing oligomers of the invention, have been shown to be compatible with ammonium dinitramide and as such there are no adverse reactions, even after prolonged and continued exposure to the lanthanide triflates. Therefore any trace amounts of rare earth metal catalyst that may be present in the final cured polymer will not cause a problem to the safety and stability of the final explosive formulation. Therefore the method according to the invention is particularly suited to provide crosslinked polymers as binders that are compatible and safe to use with energetic materials (explosive materials) that are susceptible to reaction with isocyanate groups.

For explosive formulations, there is a requirement that oligomer repeat units A, B and D, and the final crosslinked polymer are inert, stable, and compatible with energetic fillers.

The final crosslinked polymer should have a low glass transition temperature, high moisture resistance, be miscible with plasticisers and immiscible with solid energetic fillers. The resultant polymeric composites should possess hazard properties that are mitigated by the polymeric binder and mechanical properties such as tensile strength and strain capability that are suitable for use in solid propellant rocket motors, and plastic bonded explosive applications. Composites based on polybutadiene, polycaprolactone and other polyesters are commonly used for energetic polymeric compositions.

EXPERIMENTAL

A general reaction scheme is shown below in reaction scheme 1.

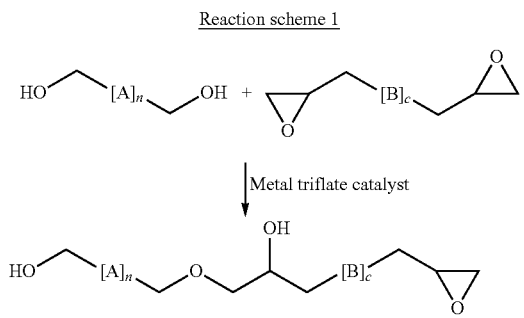

Reaction scheme 1

Example 1

General Polymer Preparation

The polyhydroxy terminated oligomers, as shown in Table 1, were typically dried in vacuo at 50° C. overnight whilst stirring. It was observed that if the catalyst was added to the polyhydroxy terminated oligomer as a solid and stirred that the dissolution times were slow and crystalline matter remained. Hence, in all subsequent preparations, the catalyst was dissolved in a minimum aliquot of acetone and stirred in to the oligomer to form a pre-admixture. The acetone was then removed by application of a vacuum.

The epoxy terminated oligomer component was added to the oligomer/catalyst pre-admixture to form the admixture, which was stirred in vacuo at 50° C. for 10 minutes until the epoxy terminated oligomer had been thoroughly mixed. The samples were poured into PTFE moulds and cured for at least a week at 60° C.

The crosslinking process and epoxy consumption was followed by dynamic stress rheology (DSR) and Fourier transform infrared spectroscopy respectively. The mechanical properties of the crosslinked cured material were studied using dynamic mechanical analysis (DMA) spectroscopy.

Hydroxy Terminated Oligomer Variation

Analysis of Gel Time

Gel time is a function of both the crosslinker molecule and the catalyst concentration, and is defined at the time when the elastic modulus crosses the damping modulus. Dynamic Stress Rheology (DSR) measurements were used to follow gel times of curing HTPB at 60° C. The gel time of the system can be tailored to meet end use requirements.

The progress of the gel reaction was monitored, for several different catalyst and oligomer A and B compounds using proton nuclear magnetic resonance spectroscopy (HNMR). It was observed that the proton on the secondary alcohol, generated from the ring opening of an epoxide, remains present on the spectra during the course of curing. This indicates that the secondary alcohol does not itself undergo reaction with a further epoxide ring at the same rate as that observed for primary hydroxyl groups.

TABLE 1

Gel time of hydroxy terminated oligomers cured with epoxy Epikote 828 and europium TFMS catalyst.

| Sample | Gel time | $1^{st}$ order rate constant | Shear Modulus at 60° C./ MPa |
|---|---|---|---|
| Desmophen 1800 | >24 | 0.00048 | 0.33 |
| polycaprolactone | >24 | 0.0011 | 0.18 |
| polyhexamethylene phthalate | 4.083333 | 0.0067 | 0.85 |
| polyhexamethylene carbonate diol | >24 | 0.00084 | 0.18 |
| polyethylene-co-1,2-butylene | Not measured | 0.0067 | 1.17 |
| HTPB | 1.41 | 0.074 | 0.53 |
| Polypropylene glycol polyethylene glycol block co-polymer | 3.5 | 0.0067 | 0.17 |
| polynimmo pp570 | >24 | 0.00735 | 0.065 |
| PolyGLYN Batch 3.24 | 20 | 0.001 | 0.85 |

Table 1 summarises the typical $1^{st}$ order curing rates (as measured by infrared spectroscopy) and the modulus of the final materials as measured using Dynamic Mechanical Analysis (DMA). The molar ratio of the polyhydroxy oligomer hydroxy end groups to epoxy end groups was 1:1, catalysed by 0.6% by mass Eu(TFMS)$_3$ and the cure was carried out at 60° C.

The crosslinking reaction was found to vary on the polymer type. The curing process for oligomer units that comprise polyether monomeric units tended to be less efficient than that measured for the monomeric units containing polyesters, HTPB and polyalkanes. This may be due to the oxyphilic behaviour of the lanthanide catalysts. Coordination of the LnTFMS on to the ether linkage, of the polyether, may decrease the effectiveness of the catalyst and thereby decrease the rate of reaction.

Comparison of Isocyanate and Epoxy Cross Linked Polymers

Table 2, below, indicates the tensile testing data of the admixture of HTPB and epoxy Epikote 828 cured by the method according to the invention. For comparison a polymerisation which uses isocyanate is provided. As a further comparison plasticized and un-plasticized examples were also prepared, the plasticiser was bis(2-ethylhexyl) sebacate.

TABLE 2

Comparison of tensile data of isocyanate cured polybutadiene with epoxy cured polybutadiene.

| Material | Tensile Modulus/ MPa | Maximum Stress/ MPa | Break Strain/% |
|---|---|---|---|
| HTPB + isophorone di-isocyanate | 1.0 | 0.4 | 55 |
| HTPB + isophorone di-isocyanate + 25% dioctyl sebacate plasticiser | 0.2 | 0.1 | 66 |
| HTPB + Epikote 828 + ErTFMS | 1.4 | 0.3 | 26 |
| HTPB + Epikote 828 + ErTFMS + 25% dioctyl sebacate plasticiser | 1.1 | 0.2 | 22 |

The physical properties were measured using Instron tensile testing. It can be seen from the results in Table 2 above that the highest modulus and maximum stress are for the unplasticised materials. The strain at break is lower for the epoxy cured materials because they are more crosslinked than the isocyanate materials.

The mechanical properties of cured elastomers over a range of temperatures were measured using dynamic mechanical analysis (DMA). The DMA traces of isophorone di-isocyanate cured HTPB (cured at 60° C. for one week) were found to be similar to the epoxy cured HTPB. Therefore methods of synthesis according to the invention provide polymers with similar mechanical properties to that of isocyanate cured polymers.

The lanthanide trifluoromethane sulphonate catalysts have been shown to significantly accelerate the epoxy ring opening process compared to un-catalysed reactions. The gel time in the presence of La(TFMS)$_3$ (5.38 hours) was more than double that measured for dysprosium and thulium TFMS. However, for most of the catalysts, the gel time did not vary greatly; this reflects the similar chemistries exhibited across the lanthanide series. The elements at the latter end of the series, however, do appear to accelerate epoxy ring opening faster than those lanthanides at the beginning of the series. This might reflect changes in Lewis acidity caused by the lanthanide contraction as the atomic number is increased.

Epoxy Variation

The effect of different epoxide oligomer materials on the curing of HTPB in the presence of one particular catalyst EuTFMS was undertaken and the results are provided in Table 3, below.

TABLE 3

Effect of epoxy crosslinking agent on the curing of HTPB

| Epoxy oligomer | Hydroxy oligomer | Gel time/ hours | 1$^{st}$ order rate constant | Shear Modulus at 60° C./MPa |
|---|---|---|---|---|
| neopentyl glycol diglycidyl ether | HTPB | 7.5 | 0.098 | 0.08 |
| trimethylolpropane triglycidyl ether | HTPB | 5.9 | 0.0054 | 0.23 |
| Epikote 828 | HTPB | 3.4 | 0.0087 | 0.69 |

The gel time and rate of reaction varies depending on the epoxide used. There is no linear relationship between the rate of consumption of the epoxy ring, (i.e. ring opening) versus the gel time rate. This may be due to complex interactions of hydroxy oligomer functionality, epoxy functionality and changes in diffusivity due to network formation i.e. crosslinking, during the cure. The epoxy and hydroxyl oligomers were curable in a desirable time period.

HTPB Cure Using Variety of Lanthanide Triflates

HTPB (containing 1% by mass of calco2246 (antioxidant)) was dried in vacuo at 50° C. overnight. Epikote 828 (available from Aldrich) was added such that there was 1:1 mol equivalence of epoxy to hydroxyl groups. A selection of lanthanide metal triflate catalysts were added in an amount of 0.1 mmol equivalent of catalyst per g of HTPB/Epikote 828. The catalyst was dissolved in a minimum quantity of solvent prior to adding to the mixture, which was subsequently removed under vacuo. The admixtures were cured at 60° C. in a fan oven for 7 days. The mechanical properties as measured by DMA are compared to a rubber made from isophorone di-isocyanate (IPDI) and HTPB.

TABLE 4

Optimisation of HTPB cure.

| Crosslinker | Catalyst | Mass % | Gel Time/ hours | 1$^{st}$ Order rate constant | Tg/ ° C. | Shear Modulus at 60° C./MPa | Shear Modulus at 25° C./MPa |
|---|---|---|---|---|---|---|---|
| Epikote 828 | Ce(TFMS)$_3$ | 0.64 | 3.17 | 0.0090 | −74 | 1.64 | 1.59 |
| Epikote 828 | Dy(TFMS)$_3$ | 0.61 | 2.76 | 0.010 | −77 | 0.68 | 0.62 |
| Epikote 828 | Sm(TFMS)$_3$ | 0.59 | 3.60 | 0.0087 | −77 | 0.69 | 0.63 |
| Epikote 828 | Yb(TFMS)$_3$ | 0.53 | 4.19 | 0.0080 | −74 | 0.71 | 0.63 |
| Epikote 828 | Tb(TFMS)$_3$ | 0.60 | 2.97 |  | −77 | 0.76 | 0.68 |
| IPDI | — | — | — | — | −68 | 0.41 | 0.40 |

The above curing reactions were followed using both infrared spectroscopy (FTIR) and dynamic stress rheology (DSR).

In the case of FTIR measurements, it was found that the resolution of the epoxy peak at 1250 cm$^{-3}$ was poor, hence the epoxy content was followed using the epoxy combination band at 4541-4510 cm$^{-3}$ in the near IR region.

A typical dynamic stress rheology (DSR) plot of curing material at 60° C. revealed that the shear modulus of the formed cross linked polymer material increased rapidly within the first three hours. Despite using different catalysts, the gel times were similar—typically 3-4 hours.

Beyond the gel point, the polymer network does not flow. Hence the measurements in Table 4 above, suggest that there is too much catalyst in the reaction mixture for explosive and propellant formulation. For the purpose of energetic binder manufacture, a gel time of about 10 to 15 hours would be required. The gel time is easily controlled by decreasing the amount of catalyst, from the results it would appear that decreasing the catalyst concentration to 0.24% will increase the gel time to 15.5 hours.

DMA indicates that the cured materials (for example Dy(T-FMS)$_3$ catalysed curing of HTPB) have higher crosslink densities than that obtained for HTPB cured with IPDI (1:1 isocyanate to hydroxyl equivalence). This may be due to secondary hydroxyls participating in the crosslinking process.

The material cured in the presence of Ce(TFMS)$_3$ is stiffer than the other five materials. This may be due to the cerium species catalysing the oxidative crosslinking of the polybutadiene backbone (possibly via the Ce(IV) salt rather than the Ce(III) salt). The material aged to a brown colour similar to that observed for aged un-stabilised isocyanate cured HTPB.

Group III Metal Trifluoromethanesulfonate Catalysts

HTPB (containing 1% by mass of calco2246 (antioxidant)) was dried in vacuo at 50° C. overnight. Yttrium triflate and scandium triflate were added to catalyse the reaction between HTPB oligomer and Epikote 828, as per Table 5. The admixture provides a 1:1 mol equivalence of epoxy to hydroxyl groups.

TABLE 5

Curing HTPB with different group III metal trifluoromethanesulfonate catalysts

| Catalyst | Mass % | Gel Time/ hours | 1$^{st}$ Order rate constant | Tg/ ° C. | Shear Modulus at 60° C./MPa | Shear Modulus at 25° C./MPa |
|---|---|---|---|---|---|---|
| Y(TFMS)$_3$ | 0.26 | 1.11 | 0.0016 | −77 | 0.53 | 0.48 |
| Sc(TFMS)$_3$ | 0.48 | 0.20 | 0.010 | −77 | 0.84 | 0.77 |
| Sc(TFMS)$_3$ | 0.16 | 5.06 | 0.0021 | −77 | 0.57 | 0.51 |

The above reactions were followed using both infrared spectroscopy (FTIR) and dynamic stress rheology (DSR). The catalytic activity of scandium triflate was greater than that of the lanthanide triflate catalysts, as indicated by the gel time and infrared spectroscopy. The consequence of this is that lower quantities of scandium triflate compared to lanthanide triflates are required to catalyse HTPB crosslinking in an equivalent amount of time.

Energetic Polymer Curing Optimisation

Energetic polymers have been specifically designed to possess a very high heat of combustion compared to traditional polymers (such as HTPB). Therefore, when an energetic composite undergoes reaction, the energetic binder adds more energy to the output. Three energetic polymers were investigated with regard to the curing procedure: Polyglyn (Glycidyl nitrate polymer), GAP (Glycidyl azide polymer) and Polynimmo (3-nitratomethyl-3-methyloxetane polymer).

PolyNIMMO and polyGLYN (2° hydroxy terminated) possess hydroxy functionality of less than two hydroxyls per polymer chain. Hence, nominally di-epoxy species such as Epikote 828 will facilitate chain extension rather than crosslinking. Multi functional epoxy crosslinkers are preferred for such materials.

PolyNIMMO

Table 6 below summarises polyNIMMO curing attempts. An excess of epoxy was used for crosslinking. The mixes were cured at 60° C. in a fan oven for 7 days.

TABLE 6

PolyNIMMO curing summary.

| Catalyst | Catalyst mass % | Epoxy oligomer | Gel time | 1st order reaction rate (IR) | DMA G' at 60° C./ MPa |
|---|---|---|---|---|---|
| Sm(TFMS)3 | 0.59 | Epikote 828 + triphenylol methane triglycidyl ether (1:1 based on epoxy mols) | >24 | 0.0006 | 0.05 |
| Sm(TFMS)3 | 0.59 | triphenylolmethane triglycidyl ether | 15.1 | 0.001 | 0.09 |
| Yb(TFMS)3 | 0.53 | triphenylolmethane triglycidyl ether | >24 hrs | 0.0018 | 0.42 |
| Sm(TFMS)3 | 0.59 | triphenylolmethane triglycidyl ether | >24 hrs | — | 0.26 |
| Dy(TFMS)3 | 0.60 | resorcinol diglycidyl ether | >24 hrs | 0.0017 | — |
| Isocyanate cured polyNIMMO | — | — | — | — | 0.14 |

The polynimmo does not possess di-hydroxyl functionality; therefore, admixtures prepared require the use of a higher functionalised epoxy oligomer. PolyNIMMO cured with a trifunctional isocyanate (Desmodur N100) exhibited lower crosslink densities that polyNIMMO cured with trifunctional epoxy in the presence of lanthanide triflates. That is to say, the crosslinking was more effective using the epoxy as the crosslinker rather than the isocyanate.

PolyGLYN

Two forms of PolyGLYN are available—oligomers with secondary hydroxyl end groups (e.g. Batch 3.24) or oligomers with secondary and primary hydroxyl end groups (e.g. Batch BX51).

TABLE 7

PolyGLYN and triphenylolmethane triglycidyl ether, using Eu(TFMS)$_3$.

| Hydroxyl oligomer | Catalyst mass % | Gel time | 1st order reaction rate (IR) | DMA G' at 0° C./ MPa | DMA G' at 60° C./ MPa |
|---|---|---|---|---|---|
| PolyGLYN Batch 3.24 (1° hydroxyl) | 0.63 | 20.2 | 0.0010 | 0.43 | 0.1 |
| PolyGLYN Batch BX51(2° hydroxyl) | 0.63 | >24 | 0.00053 | 1.5 | 0.14 |

TABLE 7-continued

PolyGLYN and triphenylolmethane triglycidyl ether, using Eu(TFMS)₃.

| Hydroxyl oligomer | Catalyst mass % | Gel time | 1st order reaction rate (IR) | DMA G' at 0° C./ MPa | DMA G' at 60° C./ MPa |
|---|---|---|---|---|---|
| PolyGLYN Batch BX51-isocyanate cure | NA | NA | NA | 1.6 | 0.3 |

Table 7 above, summarises the curing of different batches of polyGLYN with epoxy crosslinkers. The structure of the endgroups depends on the method of synthesis. PolyGLYN containing 0.6% by mass Eu(TFMS)₃ catalyst was mixed under vacuum with triphenylolmethane triglycidyl ether in a ratio of 1.1 mols epoxy to 1 mol of polyGLYN hydroxyl group. The mixes were cured at 60° C., in a fan oven, for 7 days.

The mechanical properties of the fully cured materials as shown in Tables 1-7 compare well with isocyanate cured samples. The results clearly show that hydroxy terminated oligomers crosslinked with epoxy terminated oligomers in the presence of a metal triflate catalyst used in a method according to the invention, provide crosslinked polymers that have similar physical properties to the same hydroxyl terminated oligomers when cured with isocyanates. The method according to the invention provides a less toxic, more cost effective route to cross linking hydroxyl terminated oligomers.

The results have further shown that the use of at least one metal triflate in a method according to the invention provide a means of synthesising crosslinked binders which are suitable for use with explosive materials.

The invention claimed is:
1. A method of forming a crosslinked polyether polymer comprising the steps of
    forming an admixture of at least one hydroxy terminated oligomer, at least one epoxy terminated oligomer and at least one metal trifluoromethanesulfonate salt catalyst, and
    curing the resultant admixture at 30 to 85° C.,
    wherein the at least one hydroxy terminated oligomer is a dihydroxy terminated oligomer of formula (ia)

formula (ia)

wherein A is a monomer repeat unit, m is the average number of monomer repeat units in the range of from 5 to 100,
the at least one epoxy terminated oligomer is di-epoxy oligomer of formula (iia)

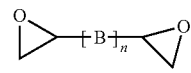

formula (iia)

wherein B is a monomer repeat unit, n is the average number of monomer repeat units in the range of from 5 to 100;
wherein A and B are independently selected from monomer repeat units comprising hydrocarbyl, esters, carbonates, ethers, amides, aromatics, heterocyclic or copolymers comprising mixtures thereof
and the admixture optionally comprises a further epoxy terminated oligomer of formula (iii) present in the range of from 5-10% w/w

formula (iii)

wherein D is a monomer repeat unit, wherein p is the average number of monomer repeat units in the range of 1 to 10000 and z is in the range of from 2.5 to 3, and D is independently selected from monomer repeat units comprising hydrocarbyl, esters, carbonates, ethers, amides, aromatics, heterocyclic or copolymers comprising mixtures thereof.

2. A method according to claim 1, wherein the hydrocarbyl is a polydiene.

3. A method according to claim 1, wherein m, n and p are in the range of from 5 to 50.

* * * * *